(12) United States Patent
Gross et al.

(10) Patent No.: US 12,145,519 B2
(45) Date of Patent: Nov. 19, 2024

(54) CONTROLLED PANEL DEFORMATION

(71) Applicant: APPLE INC., Cupertino, CA (US)

(72) Inventors: Martin Gross, Haimhausen (DE); Arturo Llamazares Domper, San Jose, CA (US); Yogesh Upreti, Riedstadt (DE)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/138,534

(22) Filed: Apr. 24, 2023

(65) Prior Publication Data

US 2023/0373421 A1 Nov. 23, 2023

Related U.S. Application Data

(60) Provisional application No. 63/342,946, filed on May 17, 2022.

(51) Int. Cl.
*B60R 19/56* (2006.01)
*B60R 19/18* (2006.01)

(52) U.S. Cl.
CPC .............. *B60R 19/56* (2013.01); *B60R 19/18* (2013.01)

(58) Field of Classification Search
CPC ......... B60R 19/12; B60R 19/56; B60R 19/18; B60R 19/40; B60R 21/34; B60R 2021/0004; B60R 21/0134; B60R 21/0136
USPC ....................................................... 180/274
See application file for complete search history.

(56) References Cited

U.S. PATENT DOCUMENTS

| | | | | |
|---|---|---|---|---|
| 5,810,427 A | * | 9/1998 | Hartmann | B60R 21/26005 296/68.1 |
| 6,189,941 B1 | * | 2/2001 | Nohr | F16F 7/123 188/371 |
| 6,394,512 B1 | * | 5/2002 | Schuster | B60R 19/12 293/118 |
| 8,950,800 B1 | | 2/2015 | Farooq et al. | |
| 10,336,290 B1 | | 7/2019 | Lazaro et al. | |
| 10,343,634 B1 | | 7/2019 | Fermer et al. | |
| 10,787,139 B2 | * | 9/2020 | Farooq | B60R 19/38 |
| 10,807,559 B2 | * | 10/2020 | Sipido | B60R 19/14 |
| 2007/0138815 A1 | | 6/2007 | Fukukawa et al. | |
| 2015/0151700 A1 | | 6/2015 | Revankar et al. | |
| 2017/0088091 A1 | * | 3/2017 | Ginn | B60R 21/34 |

FOREIGN PATENT DOCUMENTS

| | | | | |
|---|---|---|---|---|
| CN | 103963735 A | * | 8/2014 | ............. B60R 19/12 |
| DE | 10324514 A1 | * | 3/2005 | ............. B60R 19/12 |
| DE | 102004059747 A1 | | 6/2006 | |
| GB | 2336811 A | * | 11/1999 | ............. B60R 19/12 |
| GB | 2336812 A | * | 11/1999 | ............. B60R 19/38 |
| GB | 2384215 A | | 7/2003 | |
| WO | 2015103333 A1 | | 7/2015 | |

* cited by examiner

*Primary Examiner* — Paul N Dickson
*Assistant Examiner* — Caitlin Anne Miller
(74) *Attorney, Agent, or Firm* — Young Basile Hanlon & MacFarlane, P.C.

(57) ABSTRACT

An object includes an internal support and an exterior portion coupled to the internal support. A deformation portion includes a top portion and a bottom portion, and a force imparted to a first location of the exterior portion causes the bottom portion of the deformation portion to contact the exterior portion. The contact causes a deformation of the exterior portion that moves a second location of the exterior portion downward relative to the first location.

23 Claims, 5 Drawing Sheets

CONTROLLED PANEL DEFORMATION

CROSS-REFERENCE TO RELATED APPLICATIONS

This application claims the benefit of U.S. Provisional Application No. 63/342,946 filed on May 17, 2022, the contents of which are hereby incorporated by reference in its entirety for all purposes.

FIELD

The present disclosure relates generally to the field of moving an exterior portion of an object.

BACKGROUND

An exterior portion of a first object may contact a second object. In some instances, the second object or a portion thereof may be caught under the exterior portion of the first object.

SUMMARY

One aspect of the disclosure is a vehicle that includes an internal support and an exterior portion coupled to the internal support. A deformation portion includes a top portion and a bottom portion, and a force imparted to a first location of the exterior portion causes the bottom portion of the deformation portion to contact the exterior portion. The contact causes a deformation of the exterior portion that moves a second location of the exterior portion downward relative to the first location.

Another aspect of the disclosure is a vehicle that includes an internal support and an exterior portion coupled to the internal support. A deformation portion is located between the exterior portion and the internal support and is configured to engage the exterior portion to move the exterior portion in a direction that is generally perpendicular to a direction of travel of the vehicle. A controller is configured to predict that contact between the exterior portion and an object will occur and take an action based on the prediction.

Yet another aspect of the disclosure is a vehicle that includes an internal support and an exterior portion coupled to the internal support. A fluid movement component includes a first reservoir coupled to a second reservoir, and a force imparted to a first location of the exterior portion causes a fluid located in the first reservoir to move to the second reservoir. The bottom reservoir expands and imparts a second force at a second location of the exterior portion in a manner that causes or controls deformation of the exterior portion.

DETAILED DESCRIPTION

The disclosure herein relates to structures configured to cause controlled deformation of an exterior portion of a vehicle. An exterior portion of a vehicle (e.g., a portion of a front bumper, a portion of a rear bumper, etc.) may be positioned such that, if the exterior portion of the vehicle contacts an object external to the vehicle, a portion of the object may extend under or be caught under a bottom portion of the exterior portion. Some embodiments disclosed herein are directed to a deformation portion that changes its shape when the exterior portion contacts the object or before the exterior portion contacts the object, and the change in shape causes the bottom portion of the exterior portion to move downward. Other embodiments disclosed herein are directed to a hydraulic control component that is configured to move a fluid from a first reservoir to a second reservoir when the exterior portion contacts the object or before the exterior portion contacts the object, and the fluid movement causes the bottom portion of the exterior portion to move downward.

In some arrangements, a restraint prevents the deformation portion from causing the exterior portion to move downward. The restraint can be removed, for example, by the force of the contact between the object and the exterior portion. The restraint can also be removed, for example, by a controller that is configured to predict the contact between the object and the exterior portion.

Figure 1:
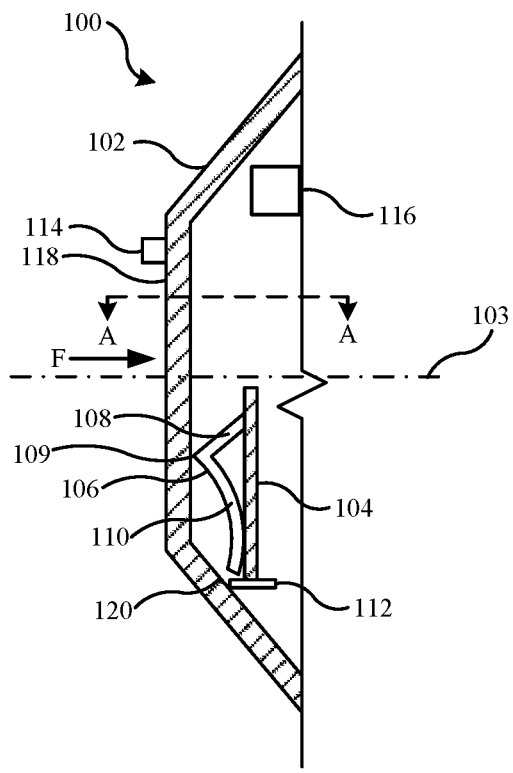
FIG. 1 is an illustration of a cross-section of a portion of a vehicle with a deformation portion in a first configuration.

FIG. 1 is an illustration of a cross-section of a portion of a vehicle 100 with a deformation portion 106 in a first configuration. The vehicle 100 can be any type of vehicle including, but not limited to, gas or diesel-powered vehicles, electric vehicles, boats or other marine vehicles, aircraft (e.g., airplanes, helicopters, etc.), remote-controlled vehicles, etc.

The vehicle 100 includes an exterior portion 102. The exterior portion 102 is an outermost portion of the vehicle 100 and may be positioned in any location around the vehicle 100. For example, the exterior portion 102 may be an exterior panel of the vehicle 100. In some embodiments, the exterior portion 102 may be a front bumper. The exterior portion 102 may also be a rear bumper and/or extend around one or more sides of the vehicle 100. The exterior portion 102 may also include surfaces that extend from a front bumper, a rear bumper, or sides of the vehicle 100 (e.g., illumination structures, grills, running boards, towing hitches, etc.). The exterior portion 102 is configured to define and at least partially enclose various operational systems of the vehicle 100. For example, the exterior portion 102 may define and at least partially enclose structural components, engine components, battery components, suspension components, heating and cooling components, etc., of the vehicle 100.

As shown, the vehicle 100 also includes an internal support 104. The internal support 104 is part of the structure of the vehicle 100. Generally, the internal support 104 may be any member configured to provide support to the vehicle 100 (e.g., torsional support, weight-bearing support, etc.) as part of the structure of the vehicle 100. In some embodiments, the exterior portion 102 is coupled to the internal support 104 and the internal support 104 supports the exterior portion 102. The internal support 104 may be configured in various orientations with respect to the vehicle 100 that can provide support. As shown in FIG. 1, the internal support 104 is oriented transverse to a longitudinal axis 103 of the vehicle 100. The internal support 104 may also be oriented along the longitudinal axis 103 of the vehicle 100 or in a generally vertical orientation (e.g., a vertical structural member). Other configurations in addition to those described may be implemented.

As shown in FIG. 1, the vehicle also includes the deformation portion 106. The deformation portion 106 includes a top portion 108 coupled to a bottom portion 110 at an apex 109 and is configured to engage the exterior portion 102 to move the exterior portion 102 downward. For example, the exterior portion 102 may move in a direction toward a road surface on which the vehicle 100 is traveling, which includes a direction generally perpendicular to a force F imparted to the exterior portion 102 at a first location 118 and/or a direction generally perpendicular to a direction of travel of the vehicle 100. In some embodiments, the deformation portion 106 causes the exterior portion 102 to move in response to the force F. In some implementations, the force F imparted at the first location 118 causes the bottom portion 110 to contact the exterior portion 102 at a second location 120, causing a deformation of the exterior portion 102 that moves the second location 120 downward relative to the first location 118. Accordingly, the deformation portion 106 operates to redirect the force F from the first location 118 to the second location 120. The deformation portion 106 may therefore be referred to as a force redirector.

For example, the deformation portion 106 may be a structure (e.g., manufactured from sheet metal, molded plastic, etc.) that has a geometric configuration that is defined to control deformation of an adjacent component upon contact. The structure may include reinforced portions and relatively weaker portions (e.g., as compared to the reinforced portions) so that the shape, manner, and/or sequence of deformation of the adjacent component occurs in a predetermined manner. In some implementations, the bottom portion 110 may be a reinforced portion and the top portion 108 may be a relatively weaker portion. Upon contact, the top portion 108 may change shape, orientation, or otherwise move to cause the bottom portion 110 to contact the exterior portion 102 at the second location 120.

In addition to, or instead of, the structure of the deformation portion 106 including reinforced portions and relatively weaker portions, the structure may also include portions that are coupled by a relatively flexible structure. In some implementations, the top portion 108 and the bottom portion 110 are coupled by a relatively flexible structure (e.g., the relatively flexible structure is flexible relative to the top portion 108 and the bottom portion 110). Upon contact, the relatively flexible structure may allow the top portion 108 and the bottom portion 110 to rotate, translate, slide, or otherwise move relative to each other to cause the bottom portion 110 to contact the exterior portion 102 at the second location 120.

In some embodiments, the deformation portion 106 is located between the exterior portion 102 and the internal support 104. The deformation portion 106 may also be positioned in other locations. In some implementations, the top portion 108 is coupled to the internal support 104. The top portion 108 may be fixedly coupled to the internal support 104 such that the part of the top portion 108 fixedly coupled to the internal support 104 is fixed relative to the internal support 104. The top portion 108 may also be movably coupled to the internal support 104 such that the top portion 108 can move (e.g., rotate, translate, etc.) relative to the internal support 104.

The deformation portion 106 may be a unitary component (e.g., the top portion 108 and the bottom portion 110 are a single component). As a unitary component, the deformation portion 106 may include a hinge that couples the top portion 108 to the bottom portion 110 and allows the top portion 108 and the bottom portion 110 to move relative to each other. In some implementations, the hinge is a living hinge. For example, a living hinge may be a portion of a structure that extends laterally across the structure and is configured to bend more readily than other portions of the structure. Accordingly, a force applied to the structure may induce rotation of a first part of the structure (e.g., the top portion 108) relative to a second part of the structure (e.g., the bottom portion 110) around an axis defined by the living hinge. As some examples, the living hinge may be defined by a portion of the structure that includes a thin portion, holes, geometric discontinuities, or any other structure that makes the living hinge more susceptible to bending than surrounding parts of the structure.

The top portion 108 and the bottom portion 110 may also be separate components that are joined together. In implementations where the top portion 108 and the bottom portion 110 are separate components, the top portion 108 and the bottom portion 110 may be joined together by a mechanical method (e.g., using fasteners), a chemical method (e.g., using adhesives), or a material-altering method (e.g., welding, soldering, brazing, etc.). Furthermore, in implementations where the top portion 108 and the bottom portion 110 are separate components, the top portion 108 and the bottom portion 110 may include the same material (e.g., both the top portion 108 and the bottom portion 110 are manufactured from stainless steel, aluminum, nitinol, polymers, etc.). The top portion 108 and the bottom portion 110 may also include different materials.

In some embodiments, the deformation portion 106 is configured to deform in response to being contacted by the exterior portion 102 (e.g., when the force F is imparted to the exterior portion 102 by an object at the first location 118). The deformation portion 106 may be configured as an elastic component that can return to its original shape when not in contact with the exterior portion 102. The deformation portion 106 may also be configured to plastically deform in response to being contacted by the exterior portion 102 so that it cannot return to its original shape when not in contact with the exterior portion 102.

As shown in FIG. 1, the top portion 108 is generally straight and the bottom portion 110 is generally curved. In some implementations, the bottom portion 110 is generally concave relative to the internal support 104. However, various shapes and configurations of the top portion 108 and the bottom portion 110 may be implemented. For example, the top portion 108 may be generally curved and the bottom portion 110 may be generally straight. As another example, both the top portion 108 and the bottom portion 110 may be generally straight or generally curved. As yet another example, both the top portion 108 and the bottom portion 110 may include combinations of generally straight and generally curved sections, where the curved sections may be generally concave and/or convex relative to the internal support 104. Furthermore, both the top portion 108 and the bottom portion 110 may include multiple generally straight sections that are oriented at various angles to each other. Other configurations in addition to those described may be implemented.

The vehicle 100 is further shown to include a restraint 112. In some embodiments, the restraint 112 is removably coupled to the deformation portion 106 and/or the internal support 104. In some implementations, the restraint 112 may be a clamp that extends at least partially around the deformation portion 106 and the internal support 104. The clamp may be curved (e.g., shaped like the letter "C") such that one end of the clamp physically contacts the deformation portion 106 and the other end of the clamp contacts the internal support 104 to secure the deformation portion 106 and the internal support 104 together. Other shapes of the clamp may also be used. The restraint 112 may also include a rigid bar (e.g., rigid relative to the deformation portion 106) movably coupled to the internal support 104 and located between the bottom portion 110 and the exterior portion 102. In some implementations, the rigid bar physically contacts the bottom portion 110. The rigid bar may be manufactured from metals, plastics, composites, or any combination thereof, and may include various geometries (e.g., round bar, rectangular bar, etc.) Accordingly, the restraint 112 is configured to secure a portion of the deformation portion 106 to the internal support 104 in a manner that resists movement of the deformation portion 106. The restraint 112 may also physically contact the deformation portion 106 in a manner that resists movement of the deformation portion 106.

In embodiments where the restraint 112 is used, the restraint 112 must be released to allow the deformation portion 106 to deform and contact the second location 120. In some implementations, the force F imparted to the first location 118 of the exterior portion 102 causes the restraint 112 to be released from the deformation portion 106 and/or the internal support 104 and then causes the deformation portion 106 to deform in response to the force F. In some embodiments, a controller 116 may cause the restraint 112 to be released. The controller 116 may cause the restraint 112 to be released before the force F is imparted to the first location 118 (e.g., before contact occurs). The controller 116 may also cause the restraint to be released after the force F is imparted to the first location 118 (e.g., after contact occurs).

A sensor 114 may be coupled to the vehicle 100. As shown, the sensor 114 is coupled to the exterior portion 102, however the sensor 114 can be positioned in various locations of the vehicle 100. The sensor 114 is configured to generate a signal based on a distance between an object and the exterior portion 102 and/or contact between an object and the exterior portion 102. The sensor 114 is further configured to provide the signal to the controller 116. Though one sensor 114 is shown in FIG. 1, more than one of the sensor 114 can be used in various implementations. In embodiments where the sensor 114 generates a signal based on distance, the sensor 114 may include one or more of an ultrasonic sensor, an infrared sensor, a light detection and ranging ("LiDAR") sensor, a time-of-flight sensor, a photoelectric sensor, or any other type of sensor configured to generate a signal based on a distance between two objects. In embodiments where the sensor 114 generates a signal based on contact, the sensor 114 may include one or more of an accelerometer, a force sensor, or any other type of sensor configured to generate a signal based on a sudden change in motion of the vehicle 100 and/or a structural change to the vehicle 100 from contact. Therefore, the sensor 114 is configured to provide an indication (e.g., a signal) to the controller 116 that contact occurred and/or that the vehicle 100 is approaching an object and that contact will occur between the vehicle 100 and the object.

The controller 116 may be located on or in the vehicle 100 and may be in communication with the sensor 114. The controller 116 may also be in communication with the restraint 112 and/or one or more actuators (not shown) that may be coupled to the restraint 112. The controller 116 is configured to receive the signal from the sensor 114 and make a determination and/or a prediction based on the signal. In some implementations, the controller 116 is configured to predict that contact will occur between the exterior portion 102 and an object and take an action based on the prediction. The action may include directing the actuator to cause the deformation portion 106 to deform and direct the exterior portion 102 downward before the contact occurs. The action may also include monitoring the sensor 114 for an indication that the contact occurred, and the controller 116 may be configured to take an additional action based on the indication that the contact occurred. The additional action may include directing the actuator to cause the deformation portion 106 to deform and direct the exterior portion 102 downward after the contact occurs.

Figure 2:
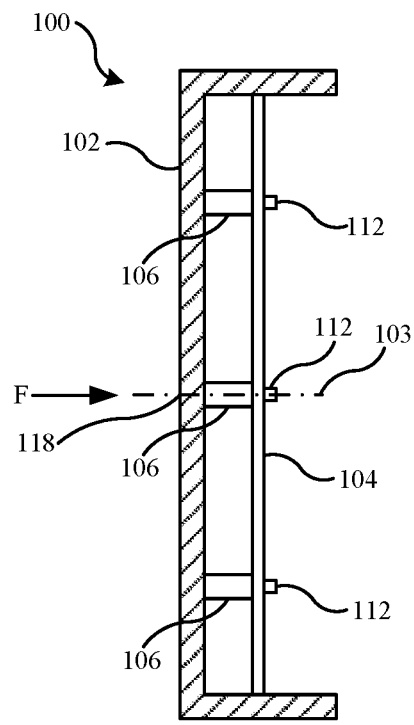
FIG. 2 is an illustration of a cross-section of the portion of the vehicle of FIG. 1 taken across A-A.

FIG. 2 is an illustration of a cross-section of the portion of the vehicle 100 of FIG. 1 taken across A-A. As shown in FIG. 2, the internal support 104 extends across an internal portion of the exterior portion 102 to support the exterior portion 102. The vehicle 100 is shown to include three of the deformation portion 106 and three of the restraint 112. More or fewer of the deformation portion 106 and the restraint 112 can be used in different implementations. In some embodiments, each deformation portion 106 is configured to deform independently based on the location of the force F (e.g., the first location 118). For example, the first location 118 may be positioned approximately in a central portion of the exterior portion 102. Accordingly, the sensor 114 may provide a signal to the controller 116 that indicates contact will occur or has occurred at the first location 118, and the controller 116 may cause the deformation portion 106 closest to the first location 118 to deform to cause the second location 120 to move downward relative to the first location 118. In some implementations, each deformation portion 106 is configured to deform as a group regardless of the location of the force F. For example, the controller 116 may cause all three of the deformation portion 106 to deform regardless of the location of the force F.

Figure 3A:
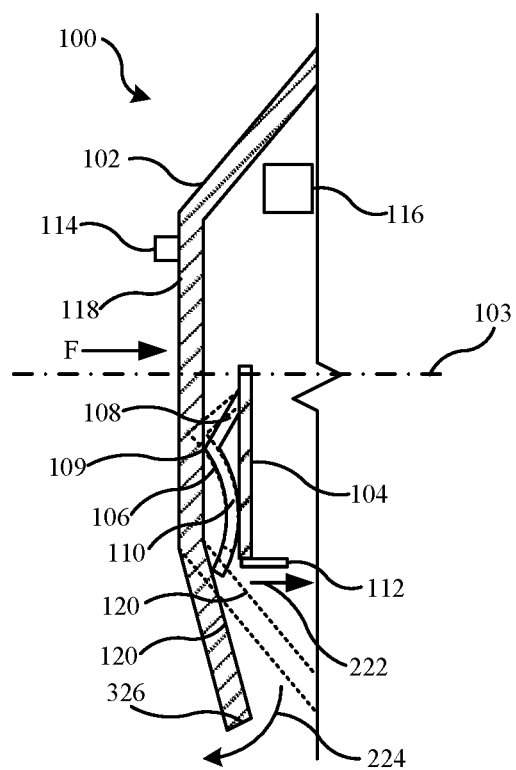
FIGS. 3A-B are illustrations of the cross-section of the portion of the vehicle of FIG. 1 with the deformation portion in a second configuration.
Figure 3B:
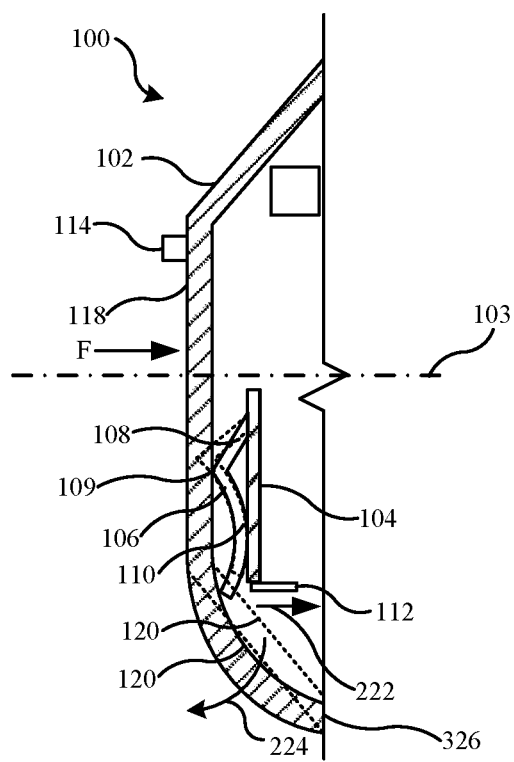

FIGS. 3A-B are illustrations of the cross-section of the portion of the vehicle 100 of FIG. 1 with the deformation portion 106 in a second configuration. The second configuration shows the relative positions of the components after contact between the vehicle 100 and an object. Portions shown in dotted lines refer to positions of the deformation portion 106 and the exterior portion 102 prior to contact. As described with reference to FIG. 1, either prior to or after the contact, the restraint 112 is released to allow the deformation portion 106 to deform in response to being contacted by the exterior portion 102. In some implementations, the controller 116 causes an actuator to release the restraint 112. The restraint 112 may also be released when the contact occurs without involvement of the controller 116 (e.g., the force F causes the restraint 112 to be released). The restraint 112 is shown as moving in the direction of the arrow 222 to indicate that the restraint 112 is released, however the restraint 112 may move in various directions and/or orientations to be released, and the movement indicated by the arrow 222 is shown as an example only.

After the exterior portion 102 collides with the object, the exterior portion 102 may move toward the deformation portion 106 and contact the apex 109. The force of the exterior portion 102 on the apex 109 may cause the top portion 108 to move toward the internal support 104. The movement of the top portion 108 may cause the bottom portion 110 to contact the internal support 104 and be directed downward by the internal support 104 to cause the bottom portion 110 to contact the second location 120 of the exterior portion 102. Therefore, the bottom portion 110 of the deformation portion 106 is configured to contact the internal support 104 to be directed to contact the second location 120 of the exterior portion 102. The second location 120 may then move downward (e.g., in the direction of the arrow 224) relative to the first location 118 and/or away from (e.g., in the direction of the arrow 224) the internal support 104. As shown in FIG. 3A, a bottom surface 326 of the exterior portion 102 may be uncoupled to another surface of the vehicle 100. Accordingly, the bottom surface 326 may be configured to move downward as the second location 120 moves downward. In some implementations, the bottom surface 326 is coupled to another surface of the vehicle 100, as shown in FIG. 3B. In such implementations, the bottom surface 326 remains coupled (e.g., the bottom surface does not move) as the second location 120 moves downward.

Figure 4:
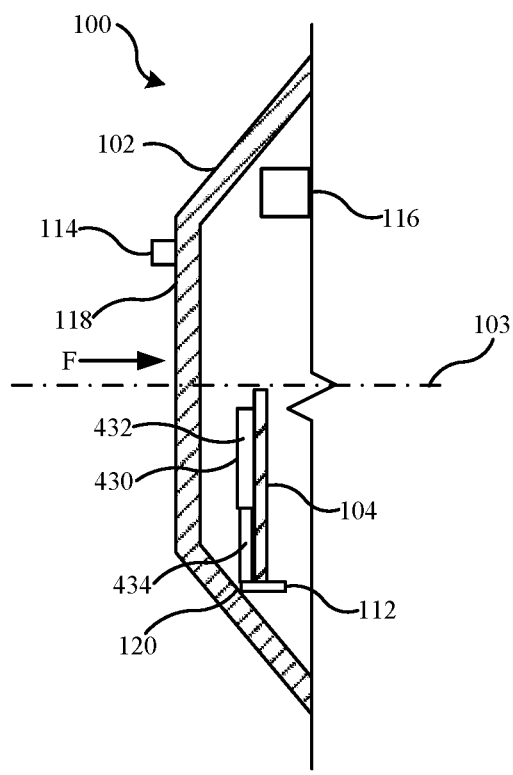
FIG. 4 is an illustration of a cross-section of a portion of the vehicle with another deformation portion in a first configuration.

FIG. 4 is an illustration of a cross-section of a portion of the vehicle 100 with another deformation portion 430 in a first configuration. The vehicle 100 includes all the components described with reference to FIGS. 1-3 with the exception that the deformation portion 430 replaces the deformation portion 106. As shown, the deformation portion 430 includes a first portion 432 coupled to a second portion 434. The first portion 432 may also be coupled to the internal support 104. In some implementations, the second portion 434 is movable relative to the first portion 432. For example, the second portion 434 may be sized to and configured to be slidably received within the first portion 432. The second portion 434 may also be prevented from sliding downward relative to the first portion 432 by the restraint 112. The deformation portion 430 may also include an extendable and/or an expandable component (not shown) positioned between the first portion 432 and the second portion 434 and configured to move the second portion 434 relative to the first portion 432. For example, the extendable component may be a spring positioned between the first portion 432 and the second portion 434. The spring may be compressed between the first portion 432 and the second portion 434 and may be configured to extend when the restraint 112 is released, thereby causing the second portion 434 to move downward relative to the first portion 432. Accordingly, the deformation portion 430 may include a compressed spring.

The expandable component may include a compressed gas that is configured to expand when the restraint 112 is released, thereby causing the second portion 434 to move downward relative to the first portion 432. The expandable component may also include multiple reactants that, when mixed together, undergo a chemical reaction that causes expansion. Accordingly, the restraint 112 may include a barrier that prevents the reactants from mixing.

Figure 5:
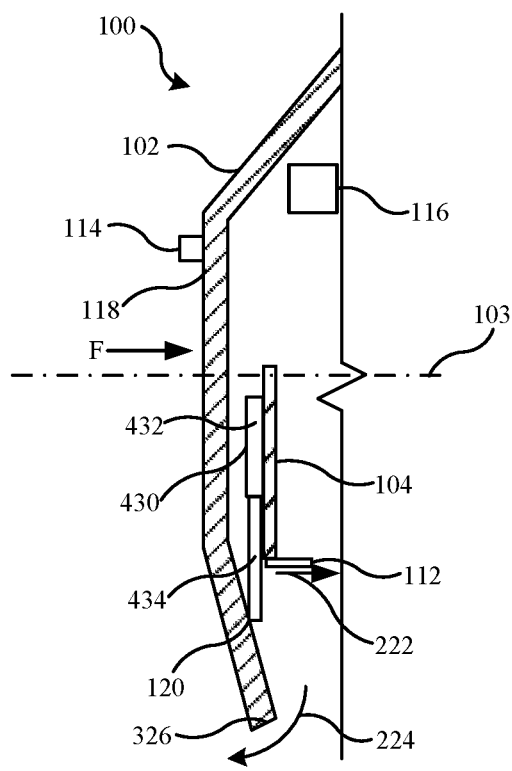
FIG. 5 is an illustration of the cross-section of the portion of the vehicle of FIG. 4 with the deformation portion in a second configuration.

FIG. 5 is an illustration of the cross-section of the portion of the vehicle 100 of FIG. 4 with the deformation portion 430 in a second configuration. The second configuration shows the relative positions of the components after contact between the vehicle 100 and an object. As described with reference to FIG. 1, either prior to or after the contact, the restraint 112 is released to allow the deformation portion 430 to deform (e.g., expand, extend, or otherwise change shape).

In some implementations, the controller 116 causes an actuator to release the restraint 112. The restraint 112 may also be released when the contact occurs without involvement of the controller 116 (e.g., the force F causes the restraint 112 to be released). The restraint 112 is shown as moving in the direction of the arrow 222 to indicate that the restraint 112 is released, however the restraint 112 may move in various directions and/or orientations to be released, and the movement indicated by the arrow 222 is shown as an example only.

After the restraint 112 is released, the second portion 434 moves downward relative to the first portion 432 and contacts the second location 120. The second location 120 may then move downward relative to the first location 118. As described with reference to FIGS. 3A-B, in some embodiments the bottom surface 326 is uncoupled and moves freely as the second location 120 moves. The bottom surface 326 may also be coupled to another surface of the vehicle 100 and therefore does not move as the second location 120 moves.

Figure 6:
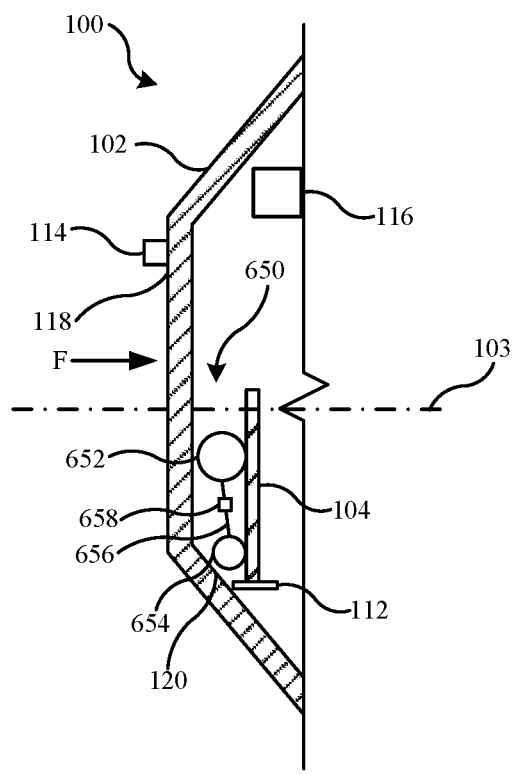
FIG. 6 is an illustration of a cross-section of a portion of the vehicle with a hydraulic component in a first configuration.

FIG. 6 is an illustration of a cross-section of a portion the vehicle 100 with a fluid movement component 650 in a first configuration. The vehicle 100 includes all the components described with reference to FIGS. 1-3 with the exception that the fluid movement component 650 replaces the deformation portion 106. The fluid movement component 650 is shown to include a first reservoir 652, a second reservoir 654, a conduit 656, and a flow control device 658.

As shown, the first reservoir 652 is located between the exterior portion 102 and the internal support 104 and is configured to hold a fluid. In some implementations, the fluid may include a gas such as air, nitrogen, or any other suitable gas or suitable combination of gases. The fluid may also include liquids such as water, ethylene glycol, propylene glycol, methanol, or any other suitable liquid or combinations of suitable liquids. The first reservoir 652 is generally flexible and is configured to deform in response to a force applied (e.g., the force F). For example, the first reservoir 652 may deform when contacted by the exterior portion 102. The first reservoir 652 may also increase or decrease in size based on an amount of the fluid located in the first reservoir 652. The first reservoir 652 may be manufactured from any flexible material suitable to hold the fluid.

The second reservoir 654 may also be located between the exterior portion 102 and the internal support 104 and is configured to hold the fluid. The second reservoir 654 is generally flexible and is configured to deform in response to a force applied (e.g., a force applied externally to the second reservoir 654 and/or a force of the fluid entering the second reservoir 654). The second reservoir 654 may increase or decrease in size based on an amount of the fluid located in the second reservoir 654. The second reservoir 654 may be manufactured from any flexible material suitable to hold the fluid. In some implementations, the material of the first reservoir 652 and the second reservoir 654 is the same material. However, the material of the first reservoir 652 may be different than the material of the second reservoir 654.

In some implementations, the second reservoir 654 may be configured to expand asymmetrically such that, when the fluid enters the second reservoir 654, the second reservoir 654 is configured to expand toward the second location 120 (e.g., away from the first location 118). Accordingly, the second reservoir 654 may include a material that resists expansion located nearer to the first reservoir 652 and a material that is expandable located further from the first reservoir 652 (e.g., nearer to the second location 120).

The fluid movement component 650 includes the conduit 656 that extends between the first reservoir 652 and second reservoir 654 and is configured to direct the fluid between the first reservoir 652 and the second reservoir 654. The conduit 656 may be generally not expandable such that when the fluid moves between the first reservoir 652 and the second reservoir 654, the conduit 656 does not expand. In some implementations, the conduit 656 is generally flexible relative to the internal support 104. The conduit 656 may also be generally inflexible (e.g., rigid). Accordingly, the fluid movement component 650 includes the first reservoir 652 fluidly coupled to the second reservoir 654 via the conduit 656.

In some implementations, the conduit 656 includes the flow control device 658 that is configured to control a flow of the fluid between the first reservoir 652 and the second reservoir 654. The flow control device 658 may include a valve, a regulator, a pump, or any other type of flow control system or device. In some embodiments, the flow control device 658 allows the fluid to flow from the first reservoir 652 to the second reservoir 654 and prevents the fluid from flowing from the second reservoir 654 to the first reservoir 652. Therefore, in some implementations the conduit 656 includes a valve between the first reservoir 652 and the second reservoir 654 that allows the fluid to flow from the first reservoir 652 to the second reservoir 654 and prevents the fluid from flowing from the second reservoir 654 to the first reservoir 652.

As described with reference to FIGS. 1-3, the restraint 112 may be removably or slidably coupled to the internal support 104. In some implementations, the flow control device 658 may be implemented in addition to, or instead of, the restraint 112, and therefore the flow control device 658 may also be part of the restraint 112. Accordingly, the controller 116 may direct the flow control device 658 to operate to prevent or allow the fluid to flow from the first reservoir 652 to the second reservoir 654 based on a signal received from the sensor 114. In some implementations, the signal from the sensor 114 may include a signal that indicates the pressure of the fluid within the first reservoir 652. The controller 116 may direct the flow control device 658 to allow the fluid to flow from the first reservoir 652 to the second reservoir 654 when the signal from the sensor 114 indicates that the pressure of the fluid within the first reservoir 652 is greater than a threshold pressure value. In some implementations, the flow control device 658 is configured to operate without intervention of the controller 116. For example, the flow control device 658 may be configured to allow the fluid to flow between the first reservoir 652 and the second reservoir 654 when the pressure of the fluid within the first reservoir 652 (and therefore, the pressure of the fluid against the flow control device 658) is greater than the threshold pressure value. Accordingly, the valve is configured to allow the fluid to flow from the first reservoir 652 to the second reservoir 654 when the pressure of the fluid within the first reservoir 652 is above the threshold pressure value.

Figure 7:
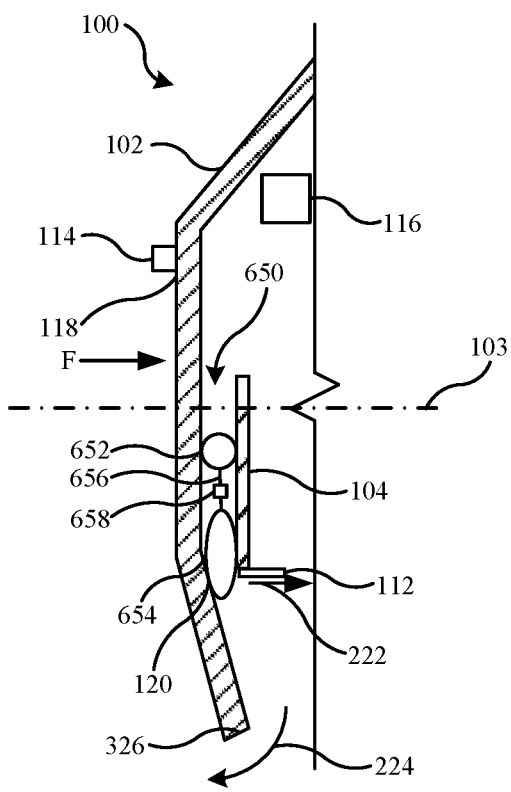
FIG. 7 is an illustration of the cross-section of the portion of the vehicle of FIG. 6 with the hydraulic component in a second configuration.

FIG. 7 is an illustration of the cross-section of the portion of the vehicle 100 of FIG. 6 with the fluid movement component 650 in a second configuration. The second configuration shows the relative positions of the components after contact between the vehicle 100 and an object. As described with reference to FIG. 1, either prior to or after the contact, the restraint 112 is released, which allows the fluid movement component 650 to operate in response to being contacted by the exterior portion 102. As described above, releasing the restraint 112 may also include the flow control device 658 allowing the fluid to flow from the first reservoir 652 to the second reservoir 654.

After the exterior portion 102 collides with the object, the exterior portion 102 may move toward the fluid movement component 650 and contact the first reservoir 652. The force imparted to the first location 118 of the exterior portion 102 may cause the first reservoir 652 to move toward the internal support 104 and therefore be compressed between the exterior portion 102 and the internal support 104. The compression of the first reservoir 652 may cause the pressure of the fluid within the first reservoir 652 to increase to a value above the threshold pressure value. As described, after the pressure of the fluid within the first reservoir 652 increases above the threshold pressure value, the flow control device 658 may allow the fluid to flow from the first reservoir 652 to the second reservoir 654 (e.g., either via direction from the controller 116 or the pressure of the fluid against the flow control device 658 may cause the flow control device 658 to allow the fluid to flow).

As the fluid flows from the first reservoir 652 to the second reservoir 654, the second reservoir 654 expands and is configured to contact both the internal support 104 and the exterior portion 102 at the second location 120. When the second reservoir 654 is expanded, the second reservoir 654 exerts an additional force on the second location 120 and causes the second location 120 to move downward relative to the first location 118. Accordingly, a first force (e.g., the force F) imparted to the first location 118 of the exterior portion 102 causes the fluid located in the first reservoir 652 to move to the second reservoir 654, causing the second reservoir 654 to expand and impart a second force (e.g., the additional force) at the second location 120 of the exterior portion 102 in a manner that causes or controls deformation of the exterior portion 102. As described with reference to FIGS. 3A-B, in some embodiments the bottom surface 326 is uncoupled and moves freely as the second location 120 moves. The bottom surface 326 may also be coupled to another surface of the vehicle 100 and therefore does not move as the second location 120 moves.

Figure 8:
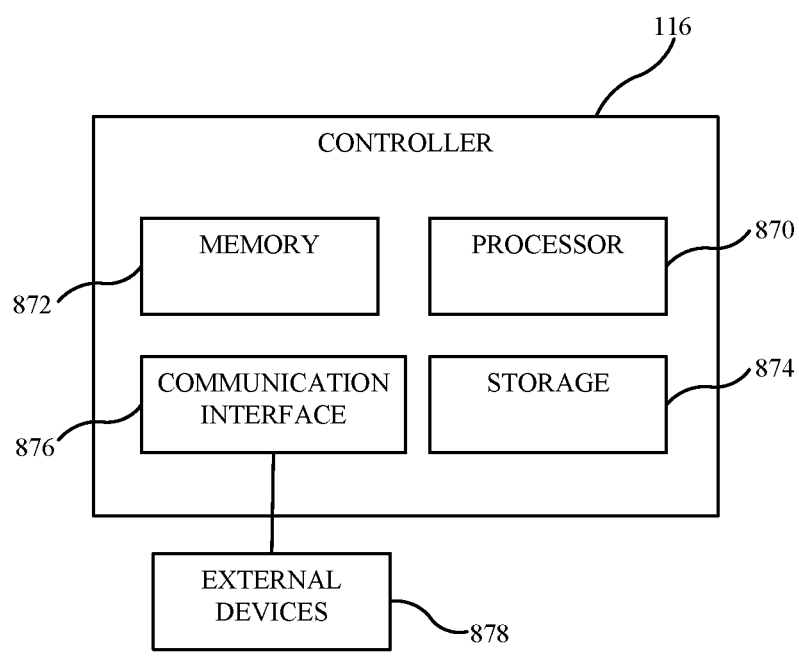
FIG. 8 is a schematic illustration of a controller.

FIG. 8 is a schematic illustration of the controller 116. The controller 116 may be used to implement the systems and methods disclosed herein. For example, the controller 116 may receive data from the sensor 114 related to the future contact between the vehicle 100 and an object and/or contact that has already occurred and control operation of the restraint 112 and/or the deformation portion 106. In an example hardware configuration, the controller 116 generally includes a processor 870, a memory 872, a storage 874, and a communications interface 876. Data received from the sensor 114 related to a future contact may include data related to a distance between the vehicle 100 and an object (e.g., an initial distance between the vehicle 100 and the object, speed of the vehicle 100, acceleration of the vehicle 100) Data received from the sensor 114 related to contact that has already occurred may include data related to acceleration of the vehicle 100 and/or a force on the exterior portion 102. The processor 870 may be any suitable processor, such as a central processing unit, for executing computer instructions and performing operations described thereby. The memory 872 may be a volatile memory, such as random-access memory (RAM). The storage 874 may be a non-volatile storage device, such as a hard disk drive (HDD) or a solid-state drive (SSD). The storage 874 may form a computer readable medium that stores instructions (e.g., code) executed by the processor 870 for operating external devices 878, for example, in the manners described above and below. The communications interface 876 is in communication with, for example, the external devices 878, for sending to and receiving from various signals (e.g., control signals and/or notifications). The external devices 878 may include, for example, the restraint 112, the deformation portion 106, and various other systems or devices through which the controller 116 may provide information to an occupant of the vehicle 100 or other parties/entities. For example, the external devices 878 may include a mobile device (e.g., a mobile phone, tablet computer, laptop computer, etc.) associated with one or more occupants of the vehicle 100, a display system within the vehicle 100, a server associated with an insurance company (e.g., the insurance company that insures the vehicle 100), a server associated with the manufacturer of the vehicle 100, etc.

As described above, one aspect of the present technology is the gathering and use of data available from various sources for use during operation and control of the deformation portion 106, the deformation portion 430, and the fluid movement component 650. As an example, such data may identify the user and include user-specific settings or preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, a user profile may be established that stores user preference related information that allows for changes to user notification settings according to the user preferences. Accordingly, use of such personal information data enhances the user's experience.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of storing a user profile for display and communication preferences, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that application usage data is maintained or entirely prohibit the development of an application usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, user display preferences may be determined each time the system is used, such as by manually entering and/or obtaining needed information in real time, and without subsequently storing the information or associating with the particular user.

What is claimed is:

1. A vehicle, comprising:
an internal support;
an exterior portion coupled to the internal support; and
a deformation portion that includes a top portion coupled to a bottom portion at an apex, wherein a force imparted to a first location of the exterior portion causes the bottom portion of the deformation portion to angularly move about the apex relative to the top portion to contact the exterior portion and cause a deformation of the exterior portion that moves a second location of the exterior portion away from the internal support.

2. The vehicle of claim 1, wherein the top portion of the deformation portion includes a distal end positioned distant from the bottom portion, an area of the top portion adjacent to the distal end is fixedly connected to the internal support.

3. The vehicle of claim 2, wherein the deformation portion comprises a unitary component.

4. The vehicle of claim 1, wherein the bottom portion of the deformation portion is configured to contact the internal support to be directed to contact the second location of the exterior portion.

5. The vehicle of claim 1, further comprising a restraint that physically contacts the deformation portion in a manner that resists movement of the deformation portion toward the second location of the exterior portion.

6. The vehicle of claim 5, wherein the force imparted to the first location of the exterior portion causes the restraint to move out of physical contact with the deformation portion and causes the deformation portion to deform in response to the force.

7. The vehicle of claim 5, further comprising:
a controller;
a sensor in electronic communication with the controller; and
an actuator in electronic communication with the controller, the actuator is coupled to the restraint and is configured to move the restraint to release the restraint from the physical contact with the deformation portion allowing the deformation portion to contact the exterior portion to move the second location of the exterior portion away from the internal support on receipt of a signal by the controller from the sensor of contact between the object and the exterior portion or a prediction that contact between the exterior portion and the object will occur.

8. The vehicle of claim 1, wherein the top portion is generally straight, the bottom portion is generally curved, and a hinge couples the top portion to the bottom portion to allow the bottom portion to angularly move relative to the top portion, wherein the hinge is positioned at the apex.

9. The vehicle of claim 1, wherein the deformation portion further comprises a hinge positioned at the apex, wherein the bottom portion of the deformation portion angularly moves relative to the top portion about the hinge on the force imparted to the first location of the exterior portion.

10. The vehicle of claim 9, wherein the hinge comprises a living hinge, the defamation portion including at least one of a reduced material thickness along the apex, through holes positioned along the apex, or geometric discontinuities positioned along the apex.

11. A vehicle, comprising:
an internal support;
an exterior portion coupled to the internal support;
a deformation portion that is located between the exterior portion and the internal support including a top portion and a bottom portion that is angularly movable relative to the top portion; and
a restraint in physical contact with the bottom portion of the deformation portion configured to resist movement of the deformation portion, wherein based on a prediction that contact will occur between the exterior portion and an object, the restraint is configured to be released from the physical contact with the bottom portion of the deformation portion, the deformation portion is configured to deform on release of the restraint by the bottom portion angularly moving relative to the top portion to engage the exterior portion to move the exterior portion in a direction that is generally perpendicular to a direction of travel of the vehicle.

12. The vehicle of claim 11, wherein the exterior portion is configured to move downward before the contact between the exterior portion and the object occurs in response to deformation of the deformation portion.

13. The vehicle of claim 11, further comprising a sensor configured to provide an indication that the predicted contact between the exterior portion and the object occurred, and the deformation portion is configured to deform based on the indication that the contact occurred.

14. The vehicle of claim 13, wherein the restraint secures a portion of the deformation portion to the internal support in a manner that resists movement of the deformation portion, and the restraint is configured to be released after the contact between the exterior portion and the object occurs.

15. The vehicle of claim 11, wherein the top portion of the deformation portion includes a distal end positioned distant from the bottom portion, and wherein an area of the top portion adjacent to the distal end is fixedly connected to the internal support.

16. A vehicle, comprising:
an internal support;
an exterior portion of the vehicle coupled to the internal support; and
a fluid movement component that includes a first reservoir fluidly coupled to a second reservoir, wherein a first force imparted to a first location of the exterior portion causes a fluid located in the first reservoir to at least partially exit from the first reservoir and to be transferred into the second reservoir, causing the second reservoir to expand and impart a second force at a second location of the exterior portion of the vehicle different than the first location in a manner that causes deformation of the exterior portion of the vehicle at the second location.

17. The vehicle of claim 16, wherein the fluid is air.

18. The vehicle of claim 16, wherein the deformation of the exterior portion of the vehicle at the second location is in a downward direction relative to a longitudinal axis of the vehicle.

19. A vehicle, comprising:
an internal support;
an exterior portion coupled to the internal support; and
a fluid movement component that includes a first reservoir fluidly coupled to a second reservoir, wherein a first force imparted to a first location of the exterior portion causes a fluid located in the first reservoir to move to the second reservoir, causing the second reservoir to expand and impart a second force at a second location of the exterior portion in a manner that causes or controls deformation of the exterior portion, wherein the second location of the exterior portion is configured to move downward relative to the first location of the exterior portion when the second reservoir is expanded.

20. A vehicle, comprising:
an internal support;
an exterior portion coupled to the internal support; and
a fluid movement component that includes a first reservoir fluidly coupled to a second reservoir by a conduit between the first reservoir and the second reservoir, the conduit includes a valve configured to allow a fluid to flow from the first reservoir to the second reservoir, wherein a first force imparted to a first location of the exterior portion causes the fluid located in the first reservoir to move to the second reservoir through the conduit and the valve, causing the second reservoir to expand and impart a second force at a second location of the exterior portion in a manner that causes or controls deformation of the exterior portion.

21. The vehicle of claim 20, wherein the valve is configured to prevent the fluid from flowing from the second reservoir to the first reservoir.

22. A vehicle, comprising:
an internal support;
an exterior portion coupled to the internal support; and
a fluid movement component that includes a first reservoir located between the exterior portion and the internal support and fluidly coupled to a second reservoir, wherein a first force imparted to a first location of the exterior portion causes the first reservoir to be compressed between the exterior portion and the internal support which causes a pressure of a fluid to increase above a threshold value, wherein the fluid located in the first reservoir moves to the second reservoir, causing the second reservoir to expand and impart a second force at a second location of the exterior portion in a manner that causes or controls deformation of the exterior portion.

23. The vehicle of claim 22, wherein the fluid movement component includes a valve between the first reservoir and the second reservoir, and the valve is configured to allow the fluid to flow from the first reservoir to the second reservoir when the pressure of the fluid is above the threshold pressure value.

* * * * *